July 28, 1942.  H. T. AVERY  2,291,136
CALCULATING MACHINE
Original Filed Jan. 23, 1933   8 Sheets-Sheet 1

INVENTOR
HAROLD T. AVERY
BY
ATTORNEY

July 28, 1942.  H. T. AVERY  2,291,136
CALCULATING MACHINE
Original Filed Jan. 23, 1933  8 Sheets-Sheet 2

INVENTOR
HAROLD T. AVERY
BY
ATTORNEY

July 28, 1942.    H. T. AVERY    2,291,136
CALCULATING MACHINE
Original Filed Jan. 23, 1933    8 Sheets-Sheet 3

FIG. 5.

INVENTOR
HAROLD T. AVERY
BY
ATTORNEY

FIG_6_

FIG_6A_

FIG_7_

INVENTOR
HAROLD T. AVERY

ATTORNEY

July 28, 1942. H. T. AVERY 2,291,136
CALCULATING MACHINE
Original Filed Jan. 23, 1933   8 Sheets-Sheet 6

INVENTOR
HAROLD T. AVERY

ATTORNEY

July 28, 1942.  H. T. AVERY  2,291,136
CALCULATING MACHINE
Original Filed Jan. 23, 1933   8 Sheets-Sheet 7

FIG_12.   FIG_13.

FIG_14.

INVENTOR
HAROLD T. AVERY

ATTORNEY

Patented July 28, 1942

2,291,136

UNITED STATES PATENT OFFICE 2,291,136

CALCULATING MACHINE

Harold T. Avery, Oakland, Calif., assignor to Marchant Calculating Machine Company, a corporation of California Original application January 23, 1933, Serial No. 653,207. Divided and this application December 3, 1940, Serial No. 368,299

11 Claims. (Cl. 235—62)

The present invention relates to calculating machines capable of automatically performing division calculations, such a machine being disclosed in the copending application of Harold T. Avery, Serial Number 653,207, filed January twenty-third, 1933, of which the present application is a division. Said application has since matured into Patent Number 2,229,630 issued on January 28, 1941. Reference may be had to the above patent for a description of a complete calculating machine including mechanism not specifically disclosed herein. It is to be understood, however, that although the invention is shown as applied to a machine of the general type disclosed in the above patent the invention is also applicable to calculating machines of other types.

It is the general object of the present invention to provide an improved division control mechanism for a calculating machine.

Another object of the invention is to provide a register controlled automatic division mechanism which will not impede the operation of the register mechanism.

In certain types of accumulator register mechanisms, such as those provided with geared tens carrying mechanism, one example of which is disclosed in the above mentioned Avery patent wherein the entry of amounts, or "digitation" and the tens carrying are simultaneously effected, spring operated parts are employed for causing sequential movements of a series of dials from "0" to "9" in registering an overdraft. Due to this feature of construction of such mechanisms, any impedance of the dials or mechanism connected thereto, caused by the association therewith of overdraft sensing mechanism, may interfere with operation of the dials especially in registering overdrafts. The present invention avoids such impedance of the register by an overdraft sensing mechanism by providing sensing mechanism arranged to be spring operated and merely released by the accumulator register instead of actually operated thereby, upon the occurrence of an overdraft. This is accomplished by providing register actuated snail cams cooperating with cam follower means; the cams being so arranged that upon the occurrence of an overdraft the cam follower means will drop from the high to the low point of its respective snail cam and thereby initiate operation of various machine controls, particularly those used in automatically controlling division calculations.

Another object of the invention is to provide a control mechanism capable of distinguishing between an overdraft and other operations of the machine resulting in movement of certain dials from "0" to "9" registrations.

A further object of the invention is to make possible the use of an overdraft controlled automatic division mechanism in machines in which the registering mechanism may remain in constant engagement with its actuating mechanism throughout a series of cycles of operation of the latter.

A further object of the invention is to make possible, selectively, either continuous driving at a uniform speed of the actuating mechanism of a calculating machine, or driving thereof either intermittently or at varying speeds in each cycle of operation.

The manner in which the above and other objects of the invention are accomplished will be readily understood on reference to the following specification when read in conjunction with the accompanying drawings wherein:

Figure 9 is a side elevational view illustrating part of the division control mechanism including the division key and the sensing mechanism.

The machine in connection with which the present invention is disclosed is of the proportional gear type wherein each accumulator register dial is cyclically driven at a speed proportional to the value selected to be entered therein. This is accomplished by providing a number of different gear combinations in each order of the machine, each combination being capable of being driven by a common cyclically operable drive means. One of the combinations in each order, depending upon the value of the factor entered in that order, may be rendered effective to drive the dial of the accumulator register aligned therewith at a speed determined by the gear ratio of the particular gear combination which is rendered effective.

Manually set selection mechanism

The machine is of the key set type in which means are provided for setting factors of a calculation upon a keyboard and subsequently operating the machine under power.

Figures 1, 2:
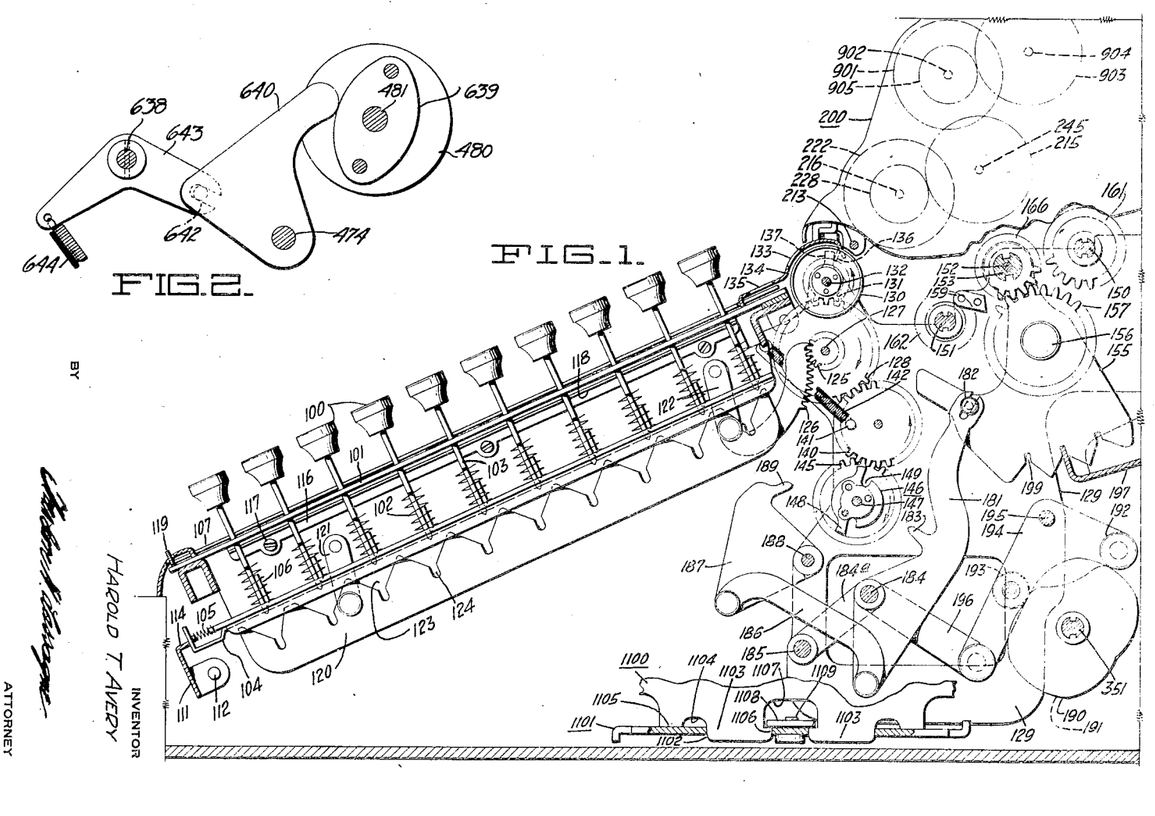
Figure 1 is a side view, partly in section, illustrating the construction of the keyboard and selecting mechanisms.
Figure 2 is a detail sectional view illustrating the pulsating cam and cam follower means therefor.

As viewed in Figure 1, each bank of value selecting keys 100 comprises a channel-shaped key frame 101 in which the key stems 103 of the various keys 100 are slidably mounted. Compression springs 102 normally maintain all of the keys 100 in raised positions.

All of the key stems 103 are of the same length and each has a cam extrusion 106 which, upon depression of the associated key, pushes to the right a slotted key locking slide 104 slidably supported on the lower side of the channel 101, thereby releasing any other latched down key in the same key section. Upon full depression of any value key the slide 101 is returned to its initial location by spring 105 and, by overlapping the upper end of the extrusion 106, latches the depressed key.

Disposed underneath the value keys 100 in each key bank is a differentially settable bar 120 which is suspended from the frame 101 by means of two parallel links 121 and 122. This bar 120 has nine identical divergent notches 123, each of which terminates in a rectangular slot 124 proportioned to receive the end of a respective key stem 103 so that the bar 120 will be accurately positioned thereby. The key stems 103 are spaced equal distances apart, each such distance being slightly greater than the spacing between successive slots 124, so that each succeeding slot 124 will be spaced one increment further away from its cooperating key stem. Thus, depression of a value key will cam the bar 120 to the right, as viewed in Figure 1, a number of increments equal to the value represented by the depressed key.

Such movement of each of the bars 120 is utilized to set up a mechanical representation of the selected value to control the calculating mechanism accordingly, and for this purpose a segmental rack gear 126 is formed integrally with each of the rear suspension links 122. This rack 126 engages a pinion 125 fixed to a gear 128 mounted on a cross rod 127. Gear 128 is entrained with a gear 145 through an idler 140, which is normally held in the position illustrated in Figure 1 by a tension spring 142 tending to maintain the selection mechanism at zero selection.

Gear 128 also meshes with a pinion 131 mounted on a cross rod 132 and secured to a check dial 130 which is visible through an opening 133 in a cover 134 to indicate the value of a factor set up in the keyboard.

Attached to each gear 145 is a cam unit generally indicated at 146, which is positioned by rotation of the gear 145 to form a mechanical representation of a value set up on the associated key bank.

Each cam unit 146 comprises five cams integrally secured together, one of such cams being illustrated in Figure 1. Each cam has two high points 148 and two low points 149 on its periphery and such cams are so staggered that no high point or low point on one cam is aligned with a high or low point on another cam. Also, it will be noted that the respective high and low points of each cam are diametrically opposite each other.

As is described in detail in the above mentioned Avery patent, the various cams on the cam unit 146 in each order of the machine are so arranged that upon depression of a value key 100, the gear 145 will be rotated to position the cam unit 146 so that one of the high points of one of the cams will be positioned in the path of a nose 183 of one of a set of five feeler arms 181 on one side of the cam unit 146, or in the path of a nose 189 of one of a set of five feeler arms 187 at the other side of the unit 146.

Power set selection mechanism

After the setting of the mechanism heretofore described has been completed and upon manipulation of one of the operation control keys such as the division key 700 (Figure 9), the power operated portion of the machine is brought into operation and acts under the control of the various cam units 146 to effect entry of a value set up on the keyboard into the accumulator register. Since this power operated mechanism is disclosed in detail in the above mentioned Avery patent only a brief description of the function of this mechanism is deemed necessary herein.

Upon depression of an operation control key, such as an add key (not shown) or the division key 700, a setting clutch dog 356 (Figure 8) is rocked, as will be described in more complete detail hereinafter, to effect engagement of a cyclically operable setting clutch 367, the details of which are also disclosed in the above Avery application.

Upon engagement of the setting clutch 367, power derived from a motor (not shown) is transmitted through the clutch to a setting shaft 351. A number of pairs of complementary cams identical to cams 190, 191 (Figure 1) are keyed to the setting shaft 351, and each such pair has an associated cam follower 194 pivoted on a cross shaft 195 and provided with a roller 192 in engagement with the cam 190 and a second roller 193 in engagement with the cam 191. As the shaft 351 rotates the cam followers 194 are rocked first, in a clockwise direction and, through links 196, impart a counter-clockwise rocking movement to a series of levers 184a pivotally mounted on a shaft 185.

A shaft 184 supported by the levers 184a has pivotally mounted thereon the group of feeler arms 181 hereinbefore mentioned, one of these groups being located adjacent each of the cam units 146. During the leftward movement of the feeler arms 181 (as viewed in Figure 1) by the shaft 184, each of the noses 183 formed on the feeler arms 181 engages the periphery of its associated cam on the cam unit 146, thereby causing each feeler arm 181 to pivot about the point of contact between its nose and the periphery of its associated cam. The balance of the forward movement of the shaft 184 by the cam followers 194 effects leftward movement of the lower ends of each of the feeler arms 181 and this movement is transmitted through a link 186 to a second feeler arm 187 aligned with each of the feeler arms 181. The arms 187 rock in a clockwise direction about a fixed shaft 188 until their noses 189 engage the periphery of the respective cams at points diametrically opposite to those engaged by the noses 183 of the associated feeler arms 181.

Thus, one of the feeler arms 181 will be rocked a considerable angle about its supporting shaft 184 to one side or the other of a medial position, depending upon whether its nose 183 is in engagement with a high point 148 or a low point 149 of its respective cam. All of the noses 183 of the other feeler arms 181 and the noses 189 of their respective aligned arms 187 will be held the same distance apart from the cam supporting shaft 147, since they will engage the illustrated concentric portions of their respective cams and thus, these latter feeler arms 181 will be held in their respective medial positions causing their upper slotted ends to each assume a position substantially as shown in Figure 1.

Each of the feeler arms 181 in each order is connected through a pin and slot connection 182 with a plate 155 pivoted on a sleeve 153 which, in turn, is pivoted on a cross rod 152, there being one such sleeve for each order of the machine. Arranged on each plate 155 is a gear 157 entrained with a laminated gear unit 166 comprising several gears keyed on the respective sleeve 153 intermediate adjacent plates 155.

From the above it will be seen that four of each group of five of the selection plates 155 will be held in a medial position as shown in Figure 1, while the fifth will be moved forward or rearward until the gear 157 thereon meshes with an aligned gear as at 162 on a quarter speed shaft 151 or an aligned gear as at 161 on a half speed shaft 150.

Gears 161 and 162 are two of a set of nine gears located on the shafts 150 and 151 and positioned in each order of the machine. The shafts 150 and 151 are connected to the drive motor (not shown) through a cyclically operable main clutch 480 (Figure 14) in such a manner that the shaft 150 is rotated through 180° for each cycle of operation of the clutch and shaft 151 is rotated through 90° for each cycle of operation of the clutch. The diameters of the various gears on the shafts 150 and 151, such as the gears 161 and 162, are so arranged that for each machine cycle the gear unit 166 will be rotated by one of the gears on the shafts 150 and 151 a partial revolution comprising a number of increments corresponding to the value of a key 100 which is depressed during a selection operation. If no key is depressed the selection plates 155 will be so arranged that none of the gears on shafts 150 and 151 will become operative to drive the gear unit 166 in that particular order.

Means are provided for locking the selection plates 155 in the relationship above described and this comprises a lock gate 197 (Figure 1) pivoted to the frame of the machine in a suitable manner (not shown) and adapted to engage one of three notches 199 in each selection plate 155. This locking gate 197 is operated by means of a suitable cam carried by the setting shaft 351 as described in the above Avery patent.

*Accumulator mechanism*

Figure 3:
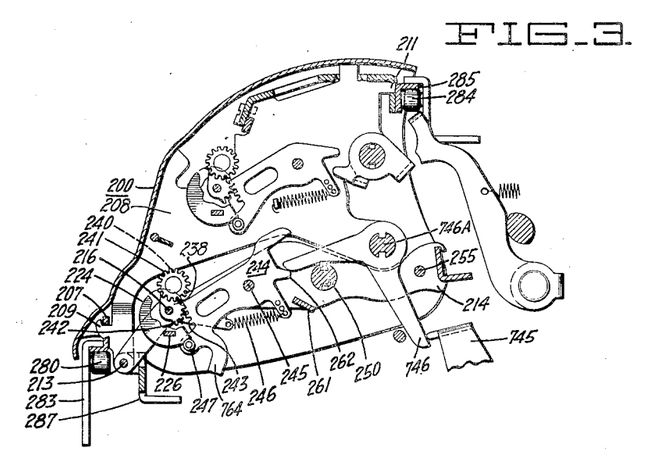
Figures 3 and 4 are sectional views of the carriage taken at different points.
Figure 4:
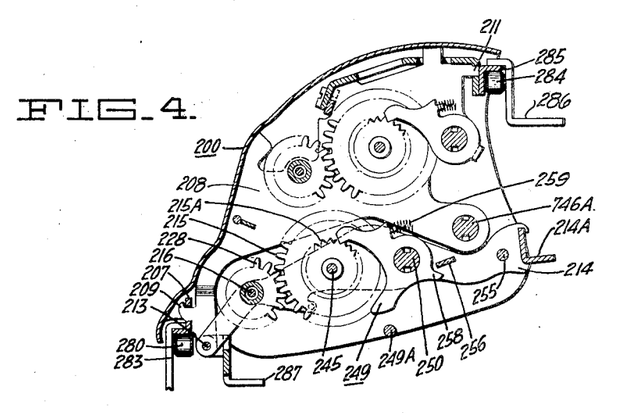

From the foregoing description of the selection mechanism it is apparent that a number comprising a plurality of digits can be registered upon the several gear units 166 by differentially driving the gears various distances proportionate to the quantitative relation of the several digits comprising the number. In order to visually indicate the number of increments of movement of the gear units 166, as well as to advance a superior registering element one extra increment whenever the next lower element has made a complete rotation, an accumulator mechanism is provided, being mounted on a transversely shiftable carriage 200 (Figures 1, 3, and 4).

The carriage is supported in the machine for transverse shifting in either direction by rollers 280 and 284 on opposite sides of the carriage. The carriage includes a track strip 207 connected to the several brace plates 208 of the carriage by hooks 209 and guided between the rollers 280 rotatably mounted on a bracket 282 extending upwardly from the machine frame, and hooks formed at the upper end of the bracket 283 to retain the front of the carriage in place. At the rear of the carriage, the rollers 284 are rotatably mounted on a bracket 286 extending from the machine frame, which rollers engage a track strip 285 carried by the carriage. The strip 285 is guided between the rollers 284 and hooks formed at the upper end of the bracket 286 to support and retain the rear of the carriage in place.

Supported in the end plates (not shown) of the carriage and by the several brace plates 208 is a cross rod 213 which serves as a pivotal support for a series of plates 214, one of which is mounted on the rod 213 adjacent each of the carriage plates 208. These plates 214 (Figures 3 and 4) are connected together at their rear ends by a common bail 214A known as the "dipping bail," by means of which the entire body of plates 214 may be oscillated about shaft 213 during operations hereinafter described, in which description of the mechanism supported by the plates 214 will be referred to as the dipping portion of the carriage.

The various denominationally arranged units of the accumulator are assembled on a rod 216 supported by the plates 214, there being one of such units between two adjacent plates 214, and each unit is adapted to be driven by one of the aforementioned gear units 166 (Figure 1) with which intermediate gears 215, rotatably mounted on shaft 245 (Figure 4) and entrained with the gears 228 of the several accumulator units, may be meshed by lowering the dipping portion of the carriage as will be described hereinafter.

Figure 5:
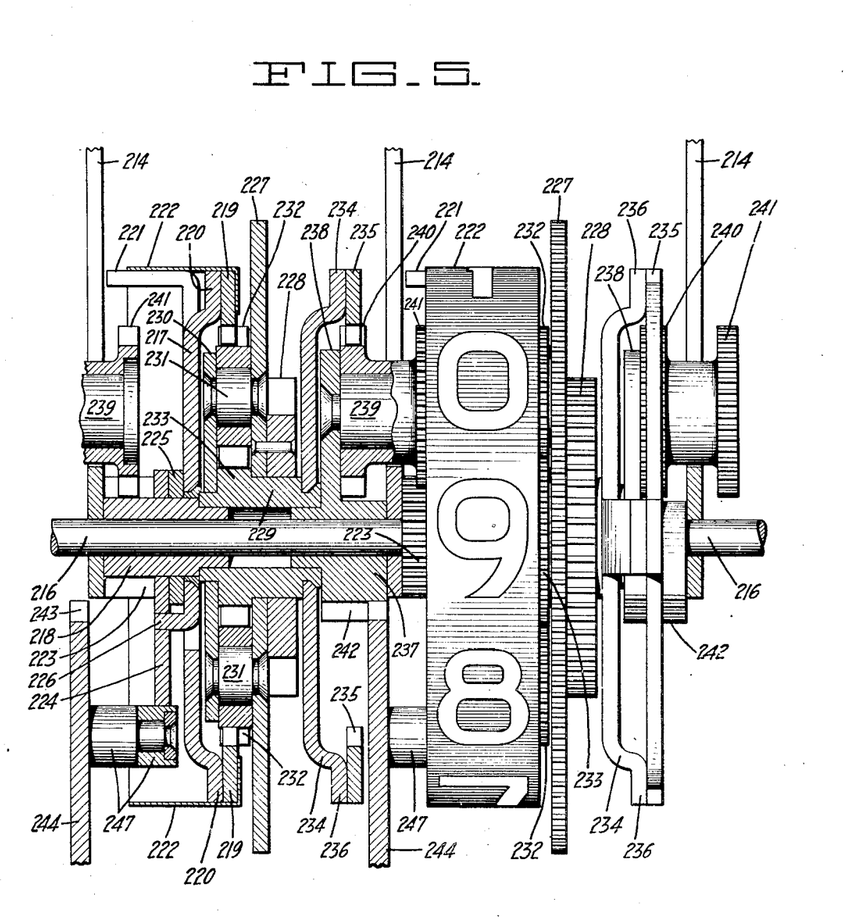
Figure 5 is an enlarged view, partly in section, illustrating two of the accumulator register dial assemblies.

Referring more particularly to Figure 5, it will be noted that each accumulator unit or order comprises a spider 217 which is rigidly secured to a sleeve 218 on the rod 216. The spider 217 carries an internal ring gear 219 on its right hand side which is spot welded or riveted to the flared out portion 220 of the spider. A thin dial shell 222 is fixed to the internal gear 219 and spider 217 and has formed around the periphery thereof a number of progressively arranged digits from "0" to "9." Integral with the sleeve 218 surrounding the rod 216 is a sun gear 223 abutting a plate 214, and interposed between the sun gear 223 and the spider 217 is a snail cam 224 and spacer 225. The snail cam 224 has a small aperture therein into which extends a lateral projection 226 of spider 217, thus causing the cam and spider to rotate as a unit with the internal gear 219 and the sun gear 223.

Immediately to the right of the mechanism just described is a large knurled disc 227 fixed to a spur gear 228. These elements are rotatably mounted on a sleeve 229 which, in turn, is rotatably mounted on a reduced portion of adjacent elements 218 and 237. The knurled disc 227 is fixed to a member 230 by studs 231 provided at each end of the member. On each of the studs is mounted a planetary gear 232 meshing with the ring gear 219, carried by the spider 217, and with another sun gear 233 formed integrally with the sleeve 229. Thus the spur gear 228, the knurled disc 227, the planet gears 232 and the ring gear 219 constitute a planetary assembly which rotates about the sleeve 229 and comprises the means by which the numeral bearing shells 222 can be rotated by the actuating mechanism of the machine which drives the gears 228.

For the purpose of carrying tens, means are provided for driving the spider 217 and its associated dial shell 222 by means of the spider 217 of the next lower order independently of any movement of gear 228.

Secured to the right end of the above mentioned sun gear sleeve 229 is a spider 234 carrying an internal gear 235. A sleeve 237 which also helps to support the sleeve 229 described above, is provided with an arm 238 (see also Figure 3) to which is secured a stub shaft 239 on which a double planet gear 240 and 241 can freely rotate. The gear section 240 of the double planet gear meshes with the internal gear 235 on spider 234 while the gear section 241 meshes with the sun gear 223 of the adjacent lower order. The part of the sleeve 237 opposite arm 238 is equipped with a gear segment 242 meshing with teeth 243 formed on a lever 244 pivoted to a shaft 245 mounted parallel to the shaft 216 and supported by the plates 214. This lever 244 is urged clockwise by spring 246 so that a roller 247 carried thereby tends to contact the snail cam 224. In the units order the sleeve 229 is secured directly to the plate 214 adjoining it at the right inasmuch as there is no lower order from which tens must be carried.

This arrangement of the several accumulator units permits simultaneous digitation and tens transfer operations known in the art as "duplexing."

In operation, the gear 228 is driven by the actuating mechanism and revolves planetary gears 232 about rod 216 as a center. Where, as in the units order, the sleeve 229 with its sun gear 233 is stationary, this revolution of gears 232 will, since they are in mesh with sun gear 233, cause said gears 232 to also rotate about studs 231 and thus drive ring gear 219 ahead in the direction in which gear 228 is being driven with a pitch line velocity just twice that at which the centers of stub shafts 239 are being revolved. Since ring gear 219 is fixed to the indicia bearing shell 222, this movement will bring a figure on the shell opposite a sight opening (not shown) of the carriage cover, indicative of the portion of a rotation given gear 228.

Whenever a given amount is thus entered in any one unit of the accumulator, one tenth of that amount will be entered in the next higher unit by means of the carrying mechanism comprising sun gear 223 fixed to spider 217 and driving planetary gears 241 and 240, these, in turn, driving internal gear 235 and spider 234 fixed to sleeve 229 of the next higher unit in a direction opposite to that of spider 217, thereby rotating the sun gear 233 integral with the sleeve. If gear 228 and studs 231 are stationary, the movement of sun gear 233 rotates ring gear 219 in the direction opposite to that of gear 233 and therefore in the same direction as that of the lower order dial transmitting the carry. If gear 228 is moving to introduce digitation, as previously described, ring gear 219 will move by an amount equal to the resultant of that produced by the rotation of gear 228 and that produced by the rotation of gear 233, the movement of the ring gear, of course, being the resultant of the movement of the sun gear and the displacement of planetary centers. Thus the movement of any higher order dial becomes the resultant of the digitation entry into its own order and the carry movement from the next lower order.

The gear ratios are, of course, such that the carry movement received by a higher order dial is one tenth of that of the lower order dial and in order that this movement may be properly transmitted to all units of the accumulator it is desirable that the digitation gear 228 move only in accordance with the values being introduced into the accumulator. To this end means are provided to prevent movement of the gears 228 except as values are being introduced. This means comprises spring pressed pawls 249 (Figure 4) freely mounted on shaft 250, each of which is adapted to engage an associated one of a series of ratchet wheels 215A on shaft 245 and fixed to the gear 215 in each order. As described above, these gears 215 mesh directly with the gears 228 of each accumulator unit and each pawl 249 therefore acts as a brake on one of said gears, being released on actuation, as will presently appear.

Thus, from the foregoing description it is apparent that rotation of a numeral wheel in any order will cause all the numeral wheels in the higher order or to the left thereof, as viewed in Figure 5, to also rotate a certain amount concurrently either in additive or subtractive direction, depending upon the direction of rotation of gears 228, while in all the orders of a lower value or to the right of the last order in which digitation takes place, no such fractional values are entered.

By virtue of this continuous gearing beween the various orders, the dials 222 are advanced so that the numerals are not properly lined up at the sight openings in the carriage cover, and in order to overcome this condition, mechanisms have been provided which will turn every numeral wheel to proper alignment with said sight openings directly after an actuation.

The mechanism for attaining this line-up operation of said dials comprises the snail cam 224 secured to the left side of each spider 217 and which cooperates with and serves to position the spring tensioned lever 244 pivoted at 245 (Figure 3). In this figure the snail cam 224 and lever 244 are shown in a position in which the roller 247 on said lever contacts with the high point of said snail cam, which high point represents the zero position of its associated dial 222. The contour of said snail cams is proportioned in such a manner that each higher digit up to nine on the dials is represented by a successive decrease in size of its radius until the lowest point on said cams represents the digit 9 on said numeral wheels; the values increasing on the dials as well as on the cams in clockwise direction, so that for addition the dials and cams are rotated in counter-clockwise direction and for subtraction in clockwise direction when viewing the machine from the right hand side.

When the dipping portion of the carriage 214 is in its lowered position, each lever 244 is normally rocked and held in a fixed position in which roller 247 is just clear of snail cam 224. Under these conditions, sleeve 237 and stud 239 (Figure 5) are held in fixed positions, and each dial is in general advanced to a partial position depending on the digitation it has received and the carry from all orders to the right. For instance, if the resultant value entered is 2,375, the first dial stands between a "2" and a "3" registration, being 0.375 of the way from the "2" to the "3" registration. The next dial stands 0.75 of the way from a "3" to a "4" registration, the next 0.5 of the way from a "7" to an "8" registration, and the next dial squarely at a "5" registration.

When the calculation is completed and the dipping portion of the carriage 214 raised, it is desired to back up each dial by the fractional amount it stands ahead of an even registration to secure a clear registration in the sight openings. To this end, each lever 244 is allowed to rock clockwise under the tension of spring 246 as plates 214 are raised until roller 247 rests against snail cam 224, which, with the cam shaped as already described, allows lever 244 to rock clockwise by an amount proportional to the registration on the dial to which the cam is attached. This rocking of each lever 244 rocks each associated sleeve 237 in a counter-clockwise direction carrying stud 239 forward by an amount proportional to the registration on the dial to the right of it, thus rocking ring gear 235 by a corresponding amount and backing up thereby the next dial to the left by an amount proportional to the registration of the next lower dial, which is the amount by which the dial stood ahead of an even position. The arrangement is therefore such that each increment of carry received from a lower order will be backed out upon completion of the calculation, unless the increment amounts to an entire position, in which case the high portion of the snail cam standing under the roller prevents such backing out. The result is that when dipping plates 214 are raised each dial is controlled by the snail cam on the next lower order dial so that the proper figure will be squarely lined up to its sight opening in the carriage cover.

Only the dial immediately to the right affects the backing up of a dial and the increment of carry in any one dial is not backed out entirely until that in the one immediately to the right is removed.

As previously mentioned, the dials and cams are rotated counterclockwise for additive movement and clockwise for subtractive movement while the cam followers 247 follow the snail cams 224 in each order. Now during subtractive operation it sometimes happens that the value subtracted is greater than the value from which it is subtracted. In this case the dials will be rotated clockwise, in the direction from "0" to "9" so that if a zero is standing in any order to the left of the last operating order a "9" will appear. This is because the roller 247 falls off the high point on the snail cam 224 to a low point, and in so doing backs up the dial in the next order one digit. If this involves a change from "0" to "9," the change will pass into the next order. Thus a whole series of nines may appear across the carriage to indicate an overdraft. This sequential movement of the dials is termed a "carry-over wave."

Figure 14:
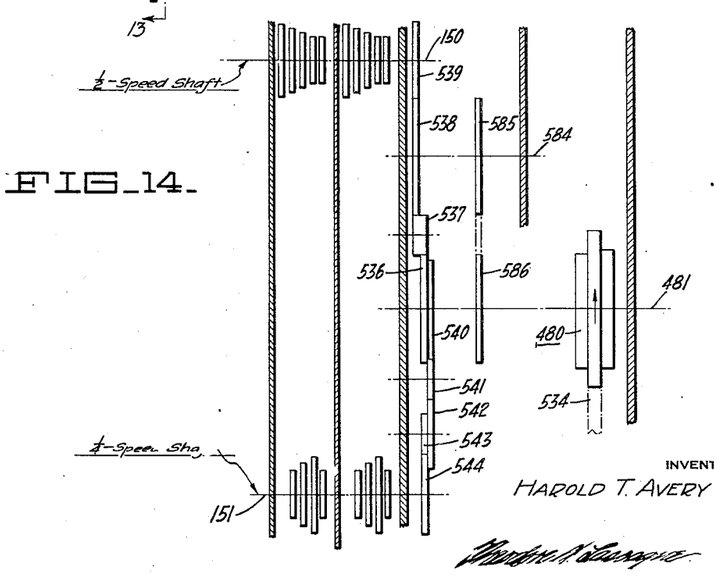
Figure 14 is a schematic view illustrating in part the drive connections between the main clutch and the quarter and half speed shafts.

A counter register for registering the quotient in division and multiplier in multiplication is also mounted in the carriage 200 and is similar in construction to that of the accumulator. Since the details of this counter register and the drive means therefore are disclosed in detail in the above mentioned Avery patent, only a brief description of the function thereof is deemed necessary herein. The several dials 901 (Figure 1) of the counter register are connected to planetary mechanism similar to that illustrated in Figure 5 and are driven by gears 905 corresponding to those of 228 of the accumulator mechanism. The gears 905 mesh with intermediate gears 903 journaled on rods 904, these latter gears each being adjusted to be driven by a gear train including the gear 538 (Figure 14). The particular gear 903 being driven at any one time depends on the position of the carriage and such gear will be driven at a rate of one tooth advance for each main clutch cycle so as to enable the counter dials 901 to register the number of main clutch cycles incurred in each carriage position.

*Carriage dipping and release mechanism*

After the heretofore described manually set selection mechanism has been operated and the selection plates 155 correctly positioned by operation of the setting clutch during the early part of its rotation and the locking gate 197 subsequently moved to lock the plates 155 in its adjusted position, entrance of the selected values into the accumulator register carriage is made so that the values will appear on the dials 222 visible through sight openings formed in the carriage cover (not shown). To effect such entry the intermediate accumulator gears 215 (Figure 6) are moved into mesh with the actuating gears 166 by rocking the several plates 214 and the bail 214a attached thereto downwardly about the pivotal supporting rod 213.

As the plates 214 are dipped the pawls 249 (Figure 4) carried by shaft 250 which, in turn, is carried by the plates 214, engage a cross rod 249A, carried by the end plates of the carriage, and are caused to rock clockwise against their springs 259 until they are released from the ratchets 215A.

To secure dipping of the carriage at the correct cyclic time means are provided under control of the setting clutch and are operated thereby to dip the dipping portion of the carriage to enable the selected values to be entered thereinto.

Figures 6, 6A:
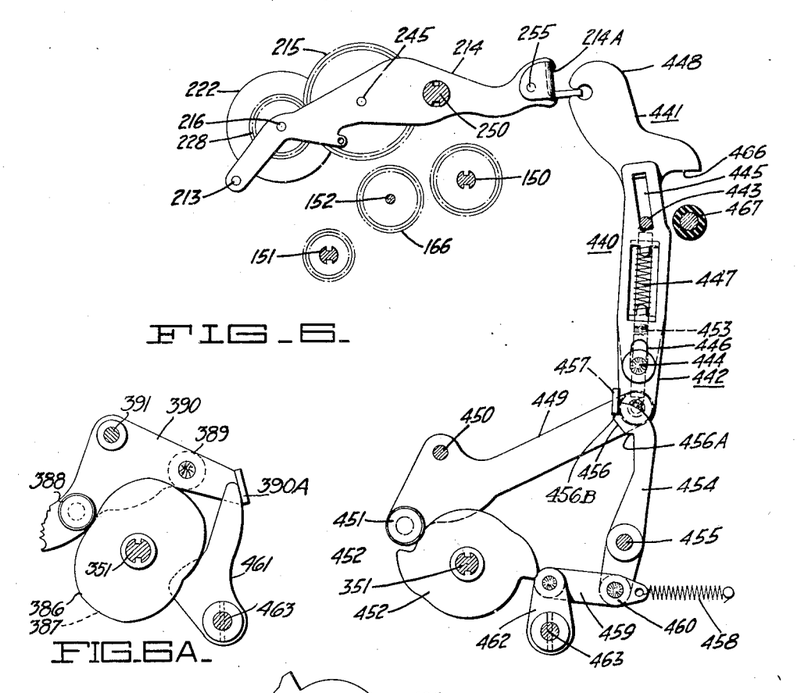
Figure 6 is a detail view in elevation, illustrating the means for raising and lowering the dipping portion of the carriage.
Figure 6A is a detail side view illustrating the cam operated means for releasing the latches 456 to enable dipping of the dipping portion of the carriage.

Such means comprises a pair of vertically movable link assemblies, one of which is shown at 440 (Figure 6). Each link assembly includes two links 441 and 442 arranged side by side and having slots 445 and 446 in which extend pins 443 and 444, the former being secured to the machine framework. A spring 447 extends in adjoining elongated apertures formed in the links 441 and 442 and embraces retaining tenons formed on the links 441 and 442 at each end of the apertures. This spring normally holds the links 441 and 442 in their contracted positions illustrated in Figure 6.

Each link 441 has a hook-shaped formation 448 at its upper end which embraces the bail 214A while each link 442 is pivotally connected at its lower end to a cam follower arm 449 pivoted at 450, and carrying a roller 451 which engages a cam 452 on the setting shaft 351.

A tension spring indicated by the dotted lines 453 extending between a pin forming a pivotal connection between the link 442 and lever 449, and the stationary pin 443, normally maintains the link assemblies 440 and carriage plates 214 in a raised position.

Means are provided for latching the carriage in a lowered position throughout the period of operation of the main clutch regardless of the number of cycles taken thereby, and for returning it to raised position where it is also latched upon termination of clutch operation.

Latches 454 (Figure 6) pivotally mounted at 455 are provided with upper notches 456B and lower notches 456A, either of which may engage lugs 457 formed on the lower links 442 of the link assemblies as at 440. Each of the latches 454 is connected to a rock shaft 463 by a link 459 pivotally connected to an arm 462 fixed to the shaft. Spring 458 tensioned between the link 459 and the machine frame tends to maintain the latch member 454 in engagement with the lug 457 and to hold the shaft 463 clockwise. Each notch 456A is offset from the corresponding notch 456B so that when lugs 457 are lowered to a position where they will be engaged by the former the spring 458 will rock shaft 463 further in a clockwise direction than when the lugs 457 are in the position illustrated in Figure 6.

To release the latches 454 in advance of operation of the cams 452 to dip the plates 214 about their supporting rods 213, means operable by the setting shaft are provided to rock the latches 454. This means comprises a pair of complementary cams 386 and 387 (Figure 6A) secured on the setting shaft 351 and engaged by rollers 388 and 389, respectively, mounted on a rocker member 390 which is pivoted at 391 to the machine frame. An ear 390A formed on the member 390 engages an arm 461 pinned to the rockable shaft 463. At the start of a setting clutch cycle the cams 386 and 387 effect rocking of the member 390, arm 461 and latches 454 to release these latches from engagement with the lugs 457. Subsequently, the cams 452 become operative to rock the cam levers 449 and dip the link assemblies 440 and plates 214. Downward movement of the link assemblies 440 is limited by a resilient stop 467 which is adapted to be engaged by a shoulder 466 formed on each of the upper links 441.

Figure 7:
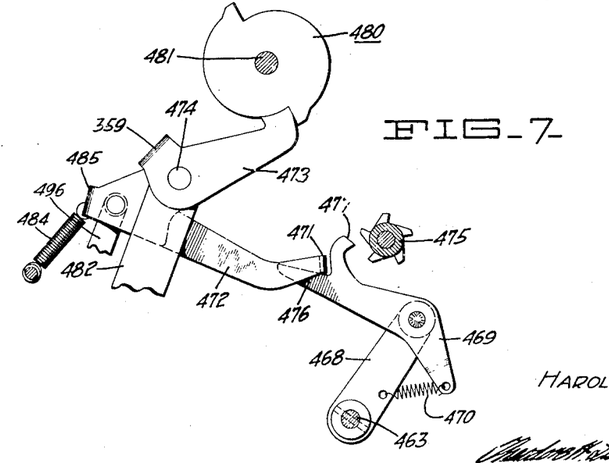
Figure 7 is a detail side view illustrating mechanism for releasing the dipping portion of the carriage from its dipped position.
Figure 8:
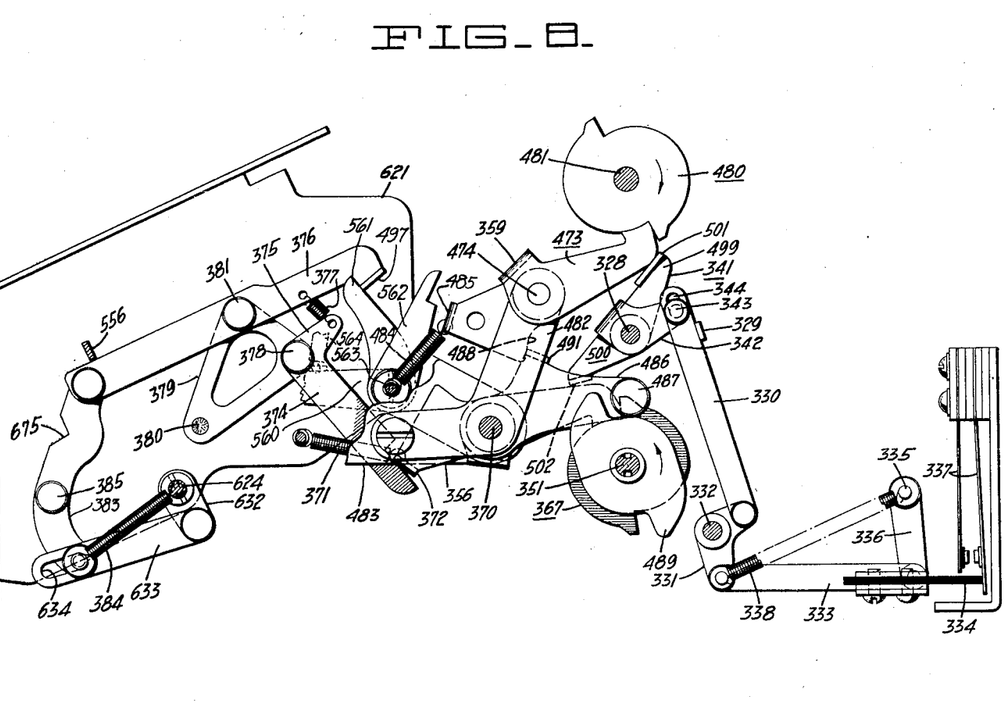
Figure 8 is a side elevational view illustrating the control of the setting clutch, main clutch, and motor switch.

The devices for releasing the latches 454 to permit the plates 214 to be moved from a lowered to a raised position comprise a ratchet wheel 475 (Figure 7) carried directly on the shaft of the driving motor (not shown) and adapted to be engaged by a hooked finger 477 on a bell crank 469 pivotally mounted on an arm 468 also attached to the shaft 463. A spring 470 tensioned between the bell crank 469 and the arm 468 tends to move the finger 477 into engagement with the ratchet 475. It should be noted that the arm 468 and bell crank 469 are shown in Figure 7 in a position they would occupy immediately after having been swung counterclockwise into latch disengaging position by the ratchet wheel 475, following disengagement of the clutch by the clutch dog 473. It should also be noted that engagement of the finger 477 by the ratchet 475 is prevented at the moment just prior to the end of the setting clutch cycle and just prior to the engagement of the main clutch by virtue of the overlapping relationship between the cams 386, 387 (Figure 6A) and 489 (Figure 8). This relationship is such that the cam 489 starts rocking the main clutch dog 473 sufficiently in advance of the counterclockwise rocking movement imparted to the member 390 by the cam 387 (resulting in clockwise rocking movement of arm 468) so as to cause the hooked finger 477 to completely miss engagement by the ratchet 475. Furthermore, the cams 452 (Figure 6) and 386, 387 are so arranged that the cam 452 will become effective to rock the assembly 449, 440, and 214 downwardly just prior to the complete counterclockwise rocking movement of member 390 and latches 454.

When the carriage is in a lowered position and the main clutch is operating a main clutch control dog 473 is held in a position rocked clockwise about a supporting shaft 474 and out of engagement with the clutch 480. An arm 472 formed integrally with the clutch dog 473 is therefore also held clockwise of the position shown in Figure 7, and an ear 471 formed thereon engages an extension 476 of the bell crank 469 to hold the latter against the action of its spring 470 to prevent the finger 477 from engaging the ratchet 475.

As the clutch dog 473 is rocked counter-clockwise, under the action of tension spring 484, to engage the main clutch 480 and effect disengagement thereof, the similar counter-clockwise movement of the arm 472 will enable the bell crank 469 to be rocked by its spring 470 until the finger 477 is engaged by one of the teeth of the ratchet 475, which will be rotating due to coasting of the motor even though the motor control circuit may be open. The impact of a tooth of ratchet 475 against the finger 477 kicks the bell crank 469 to the left, into the position indicated in Figure 7, thereby rocking the shaft 463 counter-clockwise and effecting release of the latches 454 (Figure 6).

As the plates 214 (Figure 6) move upwardly the lugs 457 on the lower links 442 of the link assemblies 440 engage cam surfaces 456 formed on the latches 454 between the notches 456A and 456B to rock the latches still further in a clockwise direction and thus rock shaft 463 to carry the finger 477 (Figure 7) of bell crank 469 leftwardly out of the path of movement of the teeth of ratchet 475. When the carriage reaches its upper position, the lugs 457 (Figure 6) engage in the notches 456B so that the carriage is latched in this position and the finger 477 is maintained out of the path of movement of ratchet 475.

*Setting and main clutch operation*

The present machine employs a setting clutch and mechanism driven thereby to effect various operations incident to the commencement of the calculation under the power of the motor.

Operation of the setting clutch 367 (Figure 8) is under the control of the machine operator, particularly through the instrumentality of various operation control keys, such as the division key 700 (Figure 9). The control of the setting clutch is such that upon depression of an add key (not shown), the division key 700 (Figure 9), et cetera, the clutch will be engaged and driven through one cycle (one-half revolution) only, regardless of the length of time that the operating key is held down.

The setting clutch 367, the details of which are disclosed in the above mentioned Avery patent, is controlled by a setting clutch dog 356 rockable on a shaft 370 and adapted when rocked counterclockwise, from the position shown in Figure 8, out of engagement with the clutch, to effect engagement thereof. Normally the clutch dog 356 is held in clutch disengaging position by a spring 371 tensioned between an ear 372 of the clutch dog and the machine frame.

The dog 356 is adapted to be rocked by depression of a bar 376 supported by a rockable frame 379 and a lever 383 pivoted at 380 and 385, respectively, to a main frame plate 621. A bell crank 374 is pivotally connected to the rockable frame 379 by a pin 378 and is notched at its lower end to fit over the ear 372 of the clutch dog 356. A spring 377 is tensioned between the bell crank 374 and the bar 376 to normally maintain the notched end of the crank 374 in engagement with the ear 372. Therefore, when the bar 376 is depressed against the action of a spring 384 tensioned between the lower end of the lever 383 and a shaft 624, the clutch dog 356 is rocked counter-clockwise about its supporting shaft 370 to effect engagement of the setting clutch 367.

As disclosed in the above mentioned Avery patent, means (not shown) operable by a cam driven by the setting shaft 351 are provided to rock the bell crank 374 out of engagement with the ear 372 of the clutch dog 356 during the first setting clutch cycle so that the spring 371 is effective to cause the dog 356 to interrupt operation of the setting clutch at the end of the first cycle of operation thereof.

Figure 12:
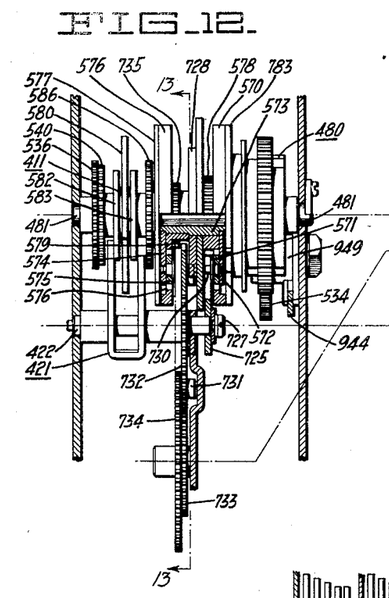
Figure 12 is a detail view, partly in section, illustrating the main clutch, the reversible division drive mechanism, and the main reverse unit.
Figure 13:
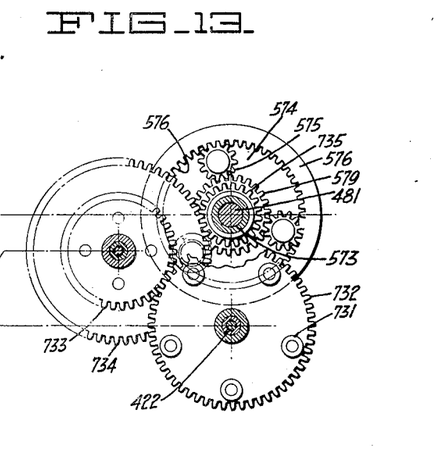
Figure 13 is a sectional view taken substantially along the line 13—13 of Figure 12.

Means operable by the setting shaft 351 are provided to initiate operation of the main clutch 480, the details of which are similar to those of the setting clutch. Secured on the setting shaft 351 is a cam 489 (Figure 8) engaged by a roller 487 mounted on a follower lever 486 which is pivoted on the shaft 370. Lever 486 has an ear 491 extending therefrom and engaging a shoulder 488 formed on an extension of the hereinbefore mentioned main clutch dog 473. Thus, upon rotation of the setting shaft 351 the cam 489 effects rocking of the lever 486 and, consequently, clockwise rocking of the main clutch dog 473 until it is out of engagement with the main clutch 480 whereupon the main clutch is engaged to drive the actuator unit comprising the half and quarter speed shafts 151, respectively (Figure 14), through the presently described division drive and main reverse units (Figures 12 and 13).

In order to maintain the main clutch 480 in engagement throughout a plurality of cycles of operation thereof a latch 562 (Figure 8), fixed on a rockable shaft 563, is provided having a notched upper end adapted to engage and latch an ear 495 on the extension of the clutch dog 473. The latch 562 is pressed against the ear 485 by a spring 564 tensioned between the machine frame and an arm 560 also pinned to the shaft 563.

An arm 561 also pinned to the shaft 563 is normally engaged by an ear 497 extending from the bar 376. The pivotal supports of the bar 376 are so arranged that upon depression of the bar the ear 497 will be moved to the right, as viewed in Figure 8, enabling the arm 561 to follow under the urge of the tension spring 564 so as to permit the latch 562 to drop in under the ear 495 of the main clutch dog 473.

Thus, as long as the bar 376 is held depressed the latch 562 will latch the dog 473 out of engagement with the main clutch 480 and the clutch will continue to cycle. However, when the bar 376 is released to allow the same to be raised by its spring 384 (Figure 8), the ear 497 will strike the arm 561 and rock the same counter-clockwise to remove the latch 562 from latching relation with the ear 485 of the main clutch dog 473 to arrest machine operation.

Control of the motor circuit is effected by the setting and main clutches through a lever 500 (Figure 8) pivoted at 328 and having ears 501 and 502 formed thereon and adapted to be engaged by the clutch dogs 473 and 356, respectively. When either of these dogs is rocked to cause engagement of its respective clutch, it will rock lever 500 clockwise about its pivot 328. Lever 500 is connected to an arm 342, which, in turn, is connected to a link 330 through a pin and slot connection 343 and 344. The link 330 is connected through a bell crank 331 pivoted at 332 to a second link 333 suspended by an arm 336 pivoted at 335 to the machine frame. Link 333 carries a piece of insulating material 334 which, when the above described linkage is held in the position illustrated in Figure 8 by a tension spring 338, holds the contacts 337 of the motor circuit switch apart. When either of the clutch dogs 473 and 356 is rocked to effect engagement of its respective clutch the motor circuit control linkage will be moved against the action of the spring 338 to retract the insulating piece 334 from the motor switch and enable the contacts 337 to close.

*General calculations drive*

Power for the various operations of the machine is supplied under control of various control keys from a motor (not shown) which is connected through a gear train including a gear 534 (Figures 12 and 14), through the main clutch 480, a division drive mechanism (Figures 12 and 13), and a main reverse mechanism 411.

During a division operation the main reverse unit and controls therefor are not affected except to transmit power from a division drive mechanism and the main clutch 480 to the actuator mechanism and, therefore, for the purpose of the present invention, only a brief description of the operation of the main reverse unit will suffice, the above described Avery patent being referred to for details of this main reverse unit.

The reverse unit 411, division drive unit, and the main clutch 480 are all mounted on a fixed shaft 481 (Figures 12 to 14), the driven side of the main clutch 480 being connected to a rotatable plate 783 to which is secured an internal gear 570. Gear 570 meshes with three planet gears 571 mounted on pins 530 extending from a planet plate 572. This plate is fixed on one end of a sleeve 573 rotatable on the shaft 481, while a second planet plate 574 is fixed on the opposite end of the sleeve 573. The second plate 574 also carries three planet gears 575 and these latter gears drive an internal gear 576 secured to a disc 577, which is keyed to a sleeve (not shown) journaled on the shaft 481 and provided with a central plate 580 (Figure 12) secured thereon.

Planet gears 571 and 575 are respectively enmeshed with sun gears 578 and 579. These sun gears are normally held against rotation except during subtractive operations in division, as will appear in the section entitled "Division mechanism and controls," so that the planet gears 571 being rotated by the internal gear 570 driven by the main clutch 480 will rotate about their own axes and also revolve about the shaft 481. Thus, the planet plate 572 is rotated, and since the sleeve 573 connects the plates 572 and 574, the latter plate 574 will also be rotated, and this rotation will be transmitted to the planet gears 575, revolving about the now fixed sun gear 579, to the internal gear 570. The disc 577 secured to the internal gear 576 thus transmits continuous rotation to the aforementioned sleeve carrying the plate 580 in the reverse unit 411.

Rotatably mounted on the above sleeve on either side of the plate 580 and independent of each other are two sleeves 582 and 583, the latter carrying a gear 586 (Figures 12 and 14) and the former carrying two gears 536 and 540 integrally connected together. Gear 586 meshes with a gear 585 (Figure 14) secured on a shaft 584 to which is also secured a gear 538, provided in a gear train connecting the half and quarter speed shafts 150 and 151, respectively. This gear train comprises gears 536 to 539, and 540 to 544, inclusive.

As described in detail in the above Avery patent rocking of a control lever 421 (Figure 12) which is pivotal on a shaft 422, to one side or the other of a medial position by the reverse control mechanism (not shown) will connect the plate 580 with one or the other of the sleeves carrying the gears 536, 540.

Due to the interposition of an idler 537 (Figure 14) intermediate the gears 536 and 538 coupling of the gear 586 to the driving plate 580 would cause rotation of the shafts 150 and 151 in a direction opposite to that caused by coupling of the plate 580 to the sleeve carrying gears 536 and 540. However, during addition and all phases of division the plate 580 remains connected with the sleeve carrying gears 536 and 540, rotation of the actuating mechanism in a subtractive direction during division being effected by the division drive mechanism as will appear presently.

*Division mechanism and controls*

The machine of the present invention includes mechanism for automatically performing division by the successive subtraction method. In accordance with this method a dividend is set up in the accumulator after which the divisor is set up in the proper columns of the keyboard. Upon operation of the machine the carriage is dipped and the accumulator carried thereby is driven in a negative direction, subtracting the divisor from the dividend until an overdraft occurs. Thereupon a positive or "restoration" stroke is made to correct the overdraft and the machine is brought to rest ready for division in the next order of the accumulator which is effected by shifting the carriage one order to the left and again initiating operation of the machine under control of the division mechanism.

Depression of the division key 700 (Figure 9) initiates motor operation by causing the contacts 337 (Figure 8) to close through engagement of the setting clutch 367. The setting clutch effects release of the locking gate 197 (Figure 1), sensing of the manually set cam unit 146, setting of the selection plates 155, and relocking of the selection plates by the locking gate 197. Also, during operation of the setting clutch, mechanism is set permitting each of the previously described levers 244, carrying rollers 247, to follow the contours of their associated cams 224 (Figures 3 and 9). The setting clutch also causes engagement of the main clutch 480 which, in turn, effects a negative driving through the division drive (Figures 12 and 13) of the quarter and half speed shafts 150 and 151 (Figure 14) at a much higher speed than is employed during other operations of the machine and intermittently instead of continuously. The division key is latched in depressed position and enables the main clutch to continue to cycle so as to subtract the value in the keyboard from that in the accumulator any number of times until the value in the operated orders is reduced to zero and an overdraft occurs.

*Control of setting clutch during division*

The division key 700 (Figure 9) is mounted on one side of a supporting plate 621 and the key stem 701 thereof is guided on pins 702, being biased in an upward direction by a spring 703 extending between the upper pin 702 and an ear formed on the key stem 701. The key stem 701 also includes a projection 704 which extends through an opening in the supporting plate to retain two operation control levers 705 and 706 (see also Figures 18 and 19) in neutral positions when the division key 700 is raised.

The levers 705 and 706 are supported on a shaft 707, the lever 705 being secured to the shaft and the lever 706 being freely pivotable thereon. The lever 705 is provided with an enlarged head at the upper end thereof forming a latching surface 710 and carrying a roller 711 which overlies the operating bar 376 (Figures 8 and 9) so that clockwise rocking of lever 705 causes depression of the bar 376 to engage the setting clutch and start the motor as described hereinbefore. A spring 712 tensioned between the lower ends of the levers 705 and 706 normally maintains an ear 717 on the lever 706 in engagement with the upper end of the lever 705.

The lever 705 has a lug 714 formed on the upper end thereof which is capable of being engaged by a nose 715 formed on a latch 708 which is pivoted at its left hand end, as viewed in Figure 9, to the supporting plate 621. A latch 709 is pivoted to the plate 621 at the same place as is latch 708 and includes a shoulder 716 which is adapted to engage the ear 717 on lever 706 during a short period in the division cycle, as will presently appear. The latches 708 and 709 are both biased in a clockwise direction by springs 718 and 719, the rearward tip of latch 709 being maintained in contact with the projection 704 on the division key stem, while the latch 708 is normally maintained in contact with the ear 714 on the upper end of the lever 705. The rearmost end of this latch 708 may be engaged by a lug 720 on an arm 721 which is pinned to a rocking shaft 638 forming part of a pulsating mechanism to be described later so as to remove the shoulder 716 from latching engagement with the ear 717 of lever 706.

Figures 15, 16, 17, 18, 19, 20:
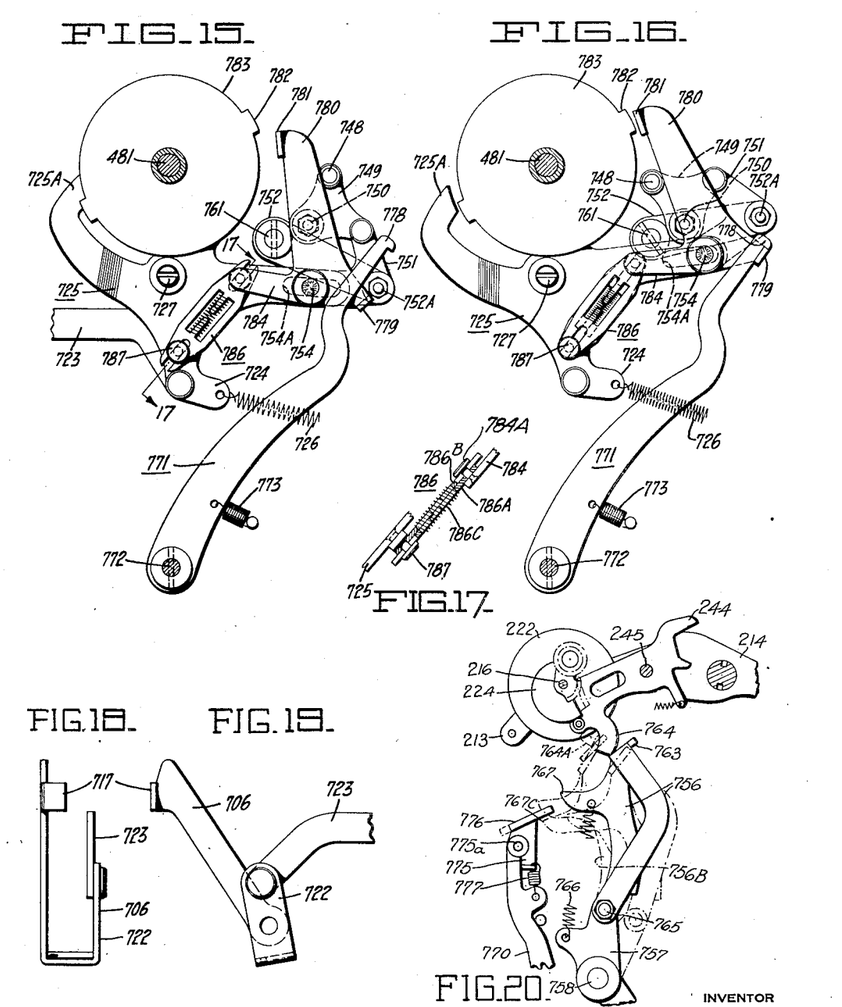
Figures 15 and 16 are corresponding views illustrating part of the division control mechanism in different positions.
Figure 17 is a sectional view of the link 786 illustrating the details of construction thereof.
Figures 18 and 19 are end and side views, respectively, of one of the levers controlled by the division key during a division operation.
Figure 20 is a side view illustrating the overdraft sensing mechanism in different positions.

Lever 706 is U-shaped, as shown in Figure 18, and includes an arm 722 which is pivotally connected to a link 723 which is, in turn, pivotally connected to a downwardly extending arm 724 of a division drive control lever 725 (Figures 9, 12, 15, and 16) mounted on the shaft 422 and held thereon by a screw 727. The lever 725 is biased in a counter-clockwise direction by a heavy spring 726 tensioned between the arm 724 and the machine frame. The bias of this spring urges lever 725 counter-clockwise and levers 705 and 706 clockwise. However, the levers 705 and 706 are normally restrained against such movement by the projection 704 of the division key stem 701.

Thus, upon depression of the division key 700 and release of the lever 705 by the projection 704, the spring 726 is free to rock levers 725, 705, and 706, causing the roller 711 on the lever 705 to depress the setting clutch controlling bar 376 to initiate operation of the setting clutch.

Conditioning of the division drive

Rocking movement of the lever 725 (Figures 9, 12, 15, and 16) by the spring 726 is utilized to condition the division drive to intermittently rotate the actuating mechanism in a negative direction and at an accelerated rate of speed during part of each cycle.

Lever 725 has an upwardly curved arm 725A formed thereon and adapted, when the lever is in the position illustrated in Figures 9 and 15, to engage a complementary notch in a box cam 728 (Figures 9 and 12) to restrain said cam against rotation. Another arm 729 is provided on the lever 725 and normally extends outside of the path of rotation of three pins 730 carried on the planet gear plate 572 described hereinbefore in the section headed "General calculations drive," these pins 730 supporting the planetary gears 571 (Figure 12).

When the lever 725 is rocked in a counterclockwise direction, as viewed in Figure 9, the arm 725A is disengaged from the cam 728 while arm 729 is positioned under one of the pins 730 so as to restrain the planet plate 572 against rotation. Since the planet plates 572 and 574, which are connected by sleeve 573, are held from rotation by the engagement of arm 729 of lever 725 with one of the pins 730 (Figure 9) and the box cam 728, to which the sun gear 578 is secured, is released, planet gears 571 will now be rotated about fixed axes and transmit rotation to the sun gear 578 at a relatively high speed. The cam 728 having the contour illustrated in Figure 9 and now driven by the sun gear 578 will successively engage each of five pins 731 riveted to a gear 732 (Figures 9, 12 and 13) journaled on the shaft 422 so as to intermittently drive this gear 732.

Gear 732 drives gear 733 which is secured to a larger gear 734 meshing with a pinion 735 (Figure 13) keyed to the sun gear 579. Gear 579, as previously mentioned, meshes with planetary gears 575 which mesh within the internal gear 576 rigidly secured to the disc 577 of the reverse unit 411.

In division, with the planet plates 572 and 574 (connected by sleeve 573) held stationary, when lever 725 is rocked in a counterclockwise direction, as viewed in Figure 9, the drive from the internal gear 570 to the internal gear 576 is through the planet gears 571, to the box cam 728 which is fixed to the sun gear 578 and driven by planet gears 571. The box cam intermittently drives gear 732 and gear train 733, 734, and 735, planet gears 575, and through these, drives the internal gear 576 and disc 577 secured thereto and finally drives a part of the reverse unit 411.

Because of the sizes and arrangement of the various gears in the division drive train just described, the reverse unit 411 and consequently the half and quarter speed shafts 150 and 151 will be driven at a rate sufficient to secure their usual angular movements of 180° and 90°, respectively, in about one-half the cyclic time, the drive being an intermittent one to provide a dwell during each cycle of operation of the actuating mechanism during which a carry-over wave can pass across the accumulator register, and the direction of rotation of the gears being such as to operate the actuating mechanism in a negative direction.

Setting of snail cam followers during division

During division the rollers 247 on the levers 244 (Figures 1, 3, 5, and 9) are permitted to follow the contours of their associated snail cams 224 when the carriage is held dipped during subtractive operation. In the order to the left of the last operated order an overdraft is sensed and is transmitted to division sensing mechanism which operates to stop the machine and initiate a single cycle of additive actuation called the corrective or "restoration" cycle. It is only necessary that the first lever 244 to the left of the last operated order being sensed be operative to control the sensing mechanism, but all levers 247 are permitted to follow the contours of their associated snail cams 224 so that a carry wave can be transmitted across the accumulator register as described hereinbefore in the section headed "Accumulator mechanism" so that an overdraft occurring in any order of the accumulator register may be transmitted to the controlling order.

In Figure 9, the elements of the accumulator register and carriage are shown in the position they occupy when at rest and before the various plates 214 (Figure 6) are dipped at the start of a division or other calculation. During dipping, the shafts 250 and 245, being supported by the dipping plates 214 are moved down with respect to the shaft 746A which is carried by the several carriage brace plates 208 (Figure 3).

Upon depression of the division key 700 (Figure 9) the spring 726 pulls lever 725 counterclockwise as disclosed hereinabove and this movement enables the bell crank 746 secured to the rockable shaft 746A to be moved by the levers 244 under action of their springs 246 to the position illustrated partly by the dotted lines in Figure 9, thereby allowing the rollers 247 on each lever 244 to engage and follow its snail cam as long as the carriage is held dipped during a subtractive actuation.

The bell cranks 746 are normally held in the position shown in Figure 9 by a lever 745 pivoted on a shaft 747 supported by the machine frame and extending into contact at the lower end thereof with a roller 748 mounted on a rock plate 749 which is pivoted on a stud 750 extending from the machine frame. The rock plate 749 is pivotally connected to one arm of a bell crank 751, pivotally mounted at 752A to an arm 752 fixed to a rockable shaft 761. A pin 754 mounted on the other arm of the bell crank 751 extends through a slot 754A in an arm 753 of the lever 725. Upon rocking of the lever 725 by the tension spring 726 as described hereinbefore, the arm 753 raises the pin 754 and, due to the particular arrangement of the bell crank 751, lever 752 and rock plate 749, causes simultaneous counterclockwise movement of lever 752 and plate 749. Thus, the plate 749 is rocked until its roller 748 reaches the position illustrated in dotted lines in Figure 9 and the lever 745 is therefore free to be rocked by the bell crank 746. Rocking movement of lever 752 also rocks shaft 761 to condition the overdraft sensing mechanism to be described presently.

Operation of sensing mechanism in carryover operation

During a division operation and while actuation takes place in a subtractive direction, the snail cams 224 (Figures 3, 9 and 20) in the operated orders are rotated clockwise and when an over carry operation takes place the lever 244 of the sensed order moves from the highest to the lowest point of its cam, this moving taking place when the dial moves from zero to nine registration. The drive is thereupon conditioned, as before mentioned, for one cycle of positive operation, bell crank 746 being returned to its original position illustrated in Figure 9 to hold the levers 244 with their rollers 247 clear of the high points of the snail cams 224. The latter can therefore rotate freely in an additive or counter-clockwise direction for one cycle.

Figures 8, 10, 11:
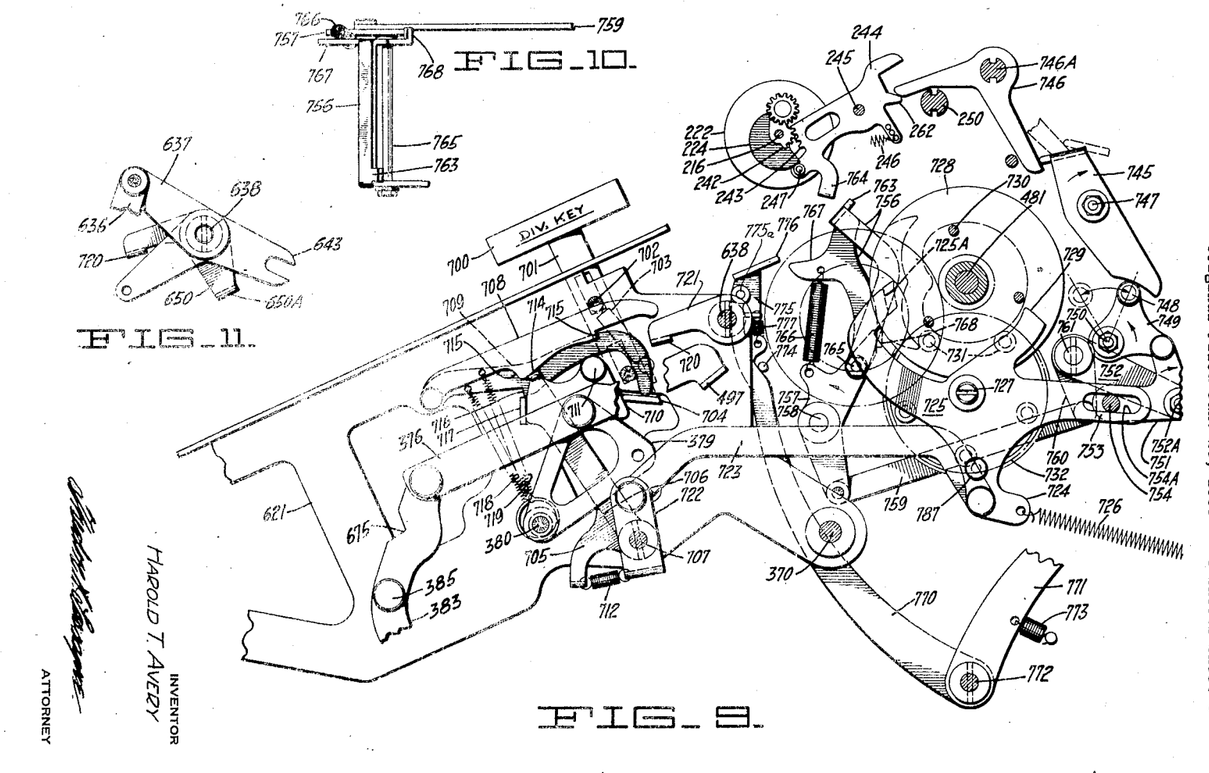
Figure 10 is a fragmentary plan view of part of the overdraft sensing mechanism.
Figure 11 is a fragmentary side view illustrating the construction of levers carried by the pulsating shaft 638.

The overdraft or carryover sensing mechanism comprises levers 756 and 757 (Figures 9, 10 and 20), the former lever having a projection 763 extending adjacent the foot 764 on the lever 244 in the order to the left of the last directly operated order. Lever 757 is pivotally mounted on a shaft 758 and is connected by a link 579 to an arm 760 fixed to the shaft 761. A lever 756 in the form of an inverted U-shape is pivoted to the lever 757 at 765 and has an ear 768 thereon which overlies an extension of the lever 757 to limit counter-clockwise rocking of the lever 756 relative to lever 757. A spring 766 tensioned between an arm 767 of lever 756 and the lever 757 normally urges the lever 756 counter-clockwise to the limit of its movement as restricted by the ear 768.

When the division key 700 is depressed and the lever 725 is rocked by spring 726 as before described the shaft 761 is rocked counter-clockwise and this movement is transmitted by the link 759 to the lever 757 so as to swing a projection 763 on the lever 756 into engagement with the foot 764 on the particular lever 244 which is positioned over the projection 763. This is the first lever 244 to the left of the last operating order. It should be noted that during this period the accumulator supporting plates 214 will be held dipped in the position illustrated in Figure 20 in a manner described hereinbefore. Thus, in division the lever 757 will always be rocked counter-clockwise to its full line position illustrated in Fig. 20, while the lever 756 which may during this period be considered as part of the cam follower means will be urged by the spring 766 to follow the foot 764 of the associated roll carrier lever 244. Therefore, with the foot 764 in that position corresponding to a zero registration on the corresponding dial 222 as illustrated in full lines in Fig. 20, the lever 756 will describe a maximum clockwise movement with respect to lever 757.

The moment an overdraft occurs, the roller 247 on the lever 244 of the overdrafted order drops from the highest point on the associated snail cam 224 to the lowest point thereon, in which case the foot 764 moves to its position 764A and permits a counter-clockwise movement of the sensing lever 756 which is employed to stop the division drive and initiate a single cycle of additive rotation during the correction cycle. The mechanism for securing this operation will now be described.

The mechanism operated as a result of the sensing of an overdraft includes arms 770 and 771 (Figures 9, 15, and 16) which are secured to a rockable shaft 772. A spring 773 tensioned between the machine frame and the arm 771 normally maintains the arms 770 and 771 in a clockwise position, as illustrated in Figures 9, 15, and 16, this movement being limited by a pin 774 extending from the machine frame.

A yieldable tip 775 is pivoted on the lever 770 at 775a and has a shelf 776 formed thereon and adapted to be engaged by the arm 767 of the sensing lever 756. A tension spring 777 extending between tip 775 and the lever 770, normally maintains the tip rocked to the extreme clockwise position, illustrated in Figure 9, with a lug formed on the tip in engagement with the lever 770. Thus, the tip 775 may yield when rocked counter-clockwise about the lever 770. The purpose of this yieldable connection is to make it possible for the sensing mechanism to distinguish between an overdraft and a normal "nine" registration without overdraft, as will appear presently.

The arm 771 (Figures 15 and 16) is formed with a hook 778 at the upper end thereof which is adapted to engage an ear 779 of a three armed dog 780 pivoted on the pin 754 so as to cause the dog to rock clockwise when the pin 754 is raised by counter-clockwise rocking of the lever 725 at the start of the division operation as was described hereinbefore.

The dog 780 has an ear 781 thereon which, upon sensing of an overdraft, is adapted to engage one of a pair of diametrically opposed projections 782 on the aforementioned plate 783 (Figures 12, 15, and 16) secured to the internal drive gear 570 of the division drive unit. The dog 780 also includes an arm 784 which is pivotally connected to the upper end of a double acting compression-expansion link assembly 786 extending between the dog 780 and the lever 725. This link assembly functions in somewhat the same manner as the link assembly 440 (Figure 6) and comprises a link 786A (Figure 17) pivoted at its upper end to the arm 784 of dog 780 by a stud 784A. This link 786A is provided with an elongated slot at the lower end thereof which embraces a stud 787 secured to the lever 725. A second link 786B is pivoted on the stud 787 and has an elongated slot embracing the stud 784A, both links having adjoining apertures therein in which extend a compression spring 786C fitted over tenons provided on each link and extending into the apertures at each end thereof. This link assembly, because of the arrangement of the spring 786C, tends to maintain a normal length, as illustrated in Figure 15, regardless of whether the link assembly is shortened or lengthened beyond such normal length.

At the beginning of a division operation the lever 725 is, as before stated, rocked counter-clockwise, raising the pin 754, arm 752, bell crank 751, and rock plate 749 into the positions shown in Figure 16, as well as moving the stud 787 to a new position which results in the dog 780 being rocked counter-clockwise until its ear 779 engages the hook 778 forming a latch therefor. Due to the fact that the pin 754 is raised a greater distance than the stud 787 of the lever 725, the link assembly 786 will be extended, compressing the spring 786 thereon, so that the same will become active to rock the dog into engagement with the plate 783 whenever the lever 771 is rocked counter-clockwise to unlatch the ear 779 on the dog 780.

When an overdraft occurs during division, the lever 756 is rocked forward from its full line position illustrated in Figure 20 towards its alternate position illustrated by the dot and dash lines 756B at which time the arm 767 engages the yieldable shelf 776 and causes rocking of the arms 770 and 771 to unlatch the dog 780, even though a yielding connection is provided between the member 775 and the arm 770, as will appear presently. The yielding connection is provided to avoid a trip-off in case the control order has a high digit, for example a "nine," when the division is first started in that order but to secure a trip off when the nine comes into such order following the registration in that order having been reduced to zero and therebeyond.

To secure this result the arm 767 on lever 756 is arranged so that it will be at such a radius from the axis of the pivot shaft 759 when the lever 756 is rocked to its extreme counter-clockwise position relative to the lever 757, as illustrated in Figure 9, that as the lever 757 is rocked forward at the start of a division operation, the arm 767 will pass freely beneath the shelf 776, as indicated at 767C (Fig. 20). Now, as the registration upon the controlling dial 222 is gradually decreased and the lever 244 rocks further and further in a counter-clockwise direction, the lever 756 will be rocked clockwise about its pivot 765, which, at this time, has assumed a certain fixed position (indicated in full lines in Fig. 20) well forward of that position in which it is shown in Figure 9. The clockwise rocking of lever 756 about this new position of its pivot 765 will cause the arm 767 to rise against the under surface of the shelf 776, rocking it in a counter-clockwise direction about its pivotal connection 775a relative to the arm 770. By the time the registration on the dial 222 has been reduced to zero the arm 767 will have rocked completely to the rear of the shelf 776 as indicated by the full lines of Fig. 20 and allowed the yieldable tip 775 to fall back into its normal position illustrated in Figure 9. When thereafter the roller 247 on the lever 244 drops off the high point of the snail cam 224 to the lowermost point thereof and allows the lever 756 to be rocked in a counter-clockwise direction to its position 756B (Fig. 20) by its spring 766, arm 767 thereon is brought down on the shelf 776 rocking the tip 775 and arm 770 together as an integral unit in a counter-clockwise direction. Due to the downward component of this latter movement of lever 756, arm 767 will not be capable of rocking the yieldable tip 775 about its pivotal connection 775a, but the lug to which the spring 777 is attached will engage and force the lever 770 counter-clockwise. Therefore, arm 771 (Figures 15 and 16) will also be rocked counter-clockwise releasing the clutch dog 780. Upon release of dog 780 the spring 786C in the link unit 786 expands to contract the link assembly into its normal position thereby rocking the dog 780 about the pin 754 until the ear 781 is moved into the path of one of the lugs 782 on the plate 783.

As a lug 782 rotating in a clockwise direction strikes the ear 781 on the dog 780, the dog is rocked in a clockwise direction, the link supporting pin 754 being so arranged that the path of movement thereof is substantially concentric about the shaft 481. The pin 754 thus rocks the lever 725 clockwise retensioning the spring 726 and forcing arm 725A to reengage the cam 728 (Figures 9 and 12). Therefore since the arm 729 is also released from engagement with one of the pins 730 on the planet plate 572 at this time, the intermittent reverse movement is arrested and the machine brought to a standstill. As the lever 725 is being rocked in a clockwise direction, the link 723 (Figure 9) rocks the lever 706 to the left until its ear 717 is latched by the shoulder 716 formed on the latch 709. Lever 705 is, however, not returned at this time, since it is retained by the rightmost shoulder, as viewed in Figure 9, of the nose 715 of the latch 708, thereby maintaining the bar 376 depressed to effect a subsequent additive restoration cycle of the main clutch.

During all main clutch cycles including restoration cycle a pulsating cam 639 (Figure 2) attached to the driven side of the main clutch 480 and rotatably mounted on the shaft 481, is rotated to rock a cam follower 640 pivoted on a stud 474 extending from the machine frame, so as to rock a lever 643 connected thereto by a pin and slot connection 642 against the action of a tension spring 644 extending between the lever 643 and the machine frame. Lever 643 is pinned on the hereinbefore mentioned pulsating shaft 633 (see also Figures 9 and 11) to which is also pinned, as before stated, the arm 721 having an ear 720 thereon underlying the latch 708. Thus, during the restoration cycle, the arm 721 rocks the latch 708 upward to release the lever 705 and the spring 712 becomes active to rock this lever counterclockwise until it assumes its normal non-operating position, illustrated in Figure 9, and releases the division key 700. Although the arm 721 is rocked upward during each main clutch cycle to rock the latch 708, it will not become effective during negative operation in division since the lever 706 is held in a rearmost position at this time and, therefore, even though the lever 705 is momentarily released from the latch 708 it is held in position by lever 706.

As the spring 726 is retensioned at the end of the negative actuation in division by movement of the lever 725, the clockwise movement of pin 754 tends to cam the dog 780 (Figures 15 and 16) from engagement with the projection 782 on the rotatable plate 783. This camming of the dog 780 is completed after the member 706 has been latched in a forward position by the latch 709 so that the spring 726 is latched under tension while the plate 783 is permitted to proceed with the restoration cycle. As the division key 700 is subsequently released and the projection 704 thereof moved along the face 710 of the member 705, the projection 704 strikes the free end of the latch 709 rocking it slightly counter-clockwise to release the ear 717 from the shoulder 716 and thus enabling the levers 705 and 706 to be latched by the projection 704.

The carriage may then be shifted to its next leftward position by any desired means and the division operation carried forward to determine additional quotient digits by repeating the operations described.

I claim:

1. In a calculating machine having an accumulator comprising a series of registering elements; an overdraft sensing mechanism comprising a cam connected to one of said elements, cam follower means spring activated to follow said cam, and means responsive to the registration of an overdraft by said accumulator including a two part device one part only of which is operable by said cam follower means during the cammed movement of said means, but both parts of which are operable by said cam follower means during the spring activated movement of said means.

2. In a calculating machine having an accumulator comprising a series of registering elements; an overdraft sensing mechanism comprising a radial cam connected to one of said elements and having a gradually increasing radius for substantially nine tenths of its circumference and a sharply decreasing radius within the remaining portion of its circumference, cam follower means, and means responsive to the registration of an overdraft by said accumulator including a member actuated by said cam follower means upon inward movement of a portion thereof along the aforesaid sharply decreasing radius of said cam.

3. In a calculating machine having an accumulator comprising a series of registering elements; an overdraft sensing mechanism comprising a radial cam connected to one of said elements and having a gradually increasing radius for substantially nine tenths of its circumference and a sharply decreasing radius within the remaining portion of its circumference, cam follower means, and means responsive to the registration of an overdraft by said accumulator including a two part device one part only of which is operable by said cam follower means upon outward movement of a portion thereof along the aforesaid gradually increasing radius of said cam, but both parts of which are operable by said cam follower means upon inward movement of said portion thereof along the aforesaid sharply decreasing radius of said cam.

4. In a calculating machine having an accumulator comprising a series of reversibly operable registering elements and actuating mechanism therefor; the combination with an overdraft sensing mechanism comprising a radial cam connected to one of said elements and having a gradually increasing radius for substantially nine tenths of its circumference and a sharply decreasing radius within the remaining portion of its circumference; of cam follower means spring activated to follow said cam, control means settable to control the direction of operation of said registering elements by said actuating mechanism, and means actuated by said control means for withdrawing said cam follower means from cooperative relationship with said cam when said control means is set to cause operation of said registering elements in one direction.

5. In a calculating machine, accumulator mechanism, rotary actuating mechanism therefor, driving means for said actuating mechanism comprising alternatively operable intermittent drive and continuous drive transmission mechanism, means for initiating operation of said actuating mechanism by said intermittent drive transmission mechanism, and means responsive to an overdraft registration in said accumulator mechanism for disabling said intermittent drive transmission and enabling said continuous drive transmission mechanism.

6. In a calculating machine having an accumulator mechanism and actuator mechanism therefor; the combination of drive means for said actuator mechanism comprising selectively operable intermittent drive and continuous drive transmissions; and means responsive to said accumulator mechanism for disabling one of said transmissions and enabling the other.

7. In a calculating machine having an accumulator mechanism, actuator mechanism therefor, and division control mechanism including a division initiating member; the combination of drive means for said actuator mechanism comprising selectively operable intermittent drive and continuous drive transmissions, means normally maintaining said continuous drive transmission enabled, and means responsive to operation of said initiating member for disabling said continuous drive transmission and enabling said intermittent drive transmission.

8. In a calculating machine having an accumulator mechanism, actuator mechanism therefor, and division control mechanism including a division initiating member; the combination of drive means for said actuator mechanism comprising selectively operable intermittent drive and continuous drive transmissions; switching means for disabling said continuous drive transmission and enabling said intermittent drive transmission, latching means for holding said switching means from operation, and means responsive to operation of said initiating member for releasing said switching means from said latching means and means responsive to an overdraft of said accumulator mechanism for again holding said switching means from operation.

9. In a calculating machine having an accumulator mechanism, actuator mechanism therefor, and division control mechanism including a division initiating member; the combination of drive means for said actuator mechanism comprising selectively operable intermittent drive and continuous drive transmissions; means normally maintaining said continuous drive transmission enabled, means responsive to operation of said initiating member for disabling said continuous drive transmission and enabling said intermittent drive transmission, sensing mechanism operable in response to an overdraft of said accumulator mechanism for disabling said intermittent drive transmission and enabling said continuous drive transmission, means normally maintaining said sensing mechanism ineffective to sense an overdraft, and means responsive to operation of said initiating member for rendering said sensing mechanism effective.

10. In a calculating machine having an accumulator mechanism, actuator mechanism therefor, and cyclically operable drive means; the combination of an intermittent drive transmission for transmitting power from said drive means to said actuator mechanism, said intermittent transmission being adapted to arrest operation of said actuator mechanism during a predetermined period in each cycle of operation of the drive means, and means operative during the said period of a cycle of operation during which an overdraft registration is effected in said accumulator mechanism for disabling said transmission.

11. In a calculating machine having an accumulator mechanism, actuator mechanism therefor, and cyclically operable drive means; the combination of selectively operable intermittent drive and continuous drive transmissions operable in opposite directions for transmitting power from said drive means to said actuator mechanism, said intermittent transmission being adapted to arrest operation of said actuator mechanism during a predetermined period in each cycle of operation of said drive means, division control means including means for initiating operation of said actuator mechanism by said intermittent transmission; and means operative during the said period of a cycle of operation during which an overdraft registration is effected in said accumulator mechanism and responsive to said overdraft for disabling said intermittent transmission and enabling said continuous transmission.

HAROLD T. AVERY.